June 2, 1931.  J. O. HEINZE  1,808,109
MOTOR VEHICLE
Filed Oct. 24, 1928    2 Sheets-Sheet 1
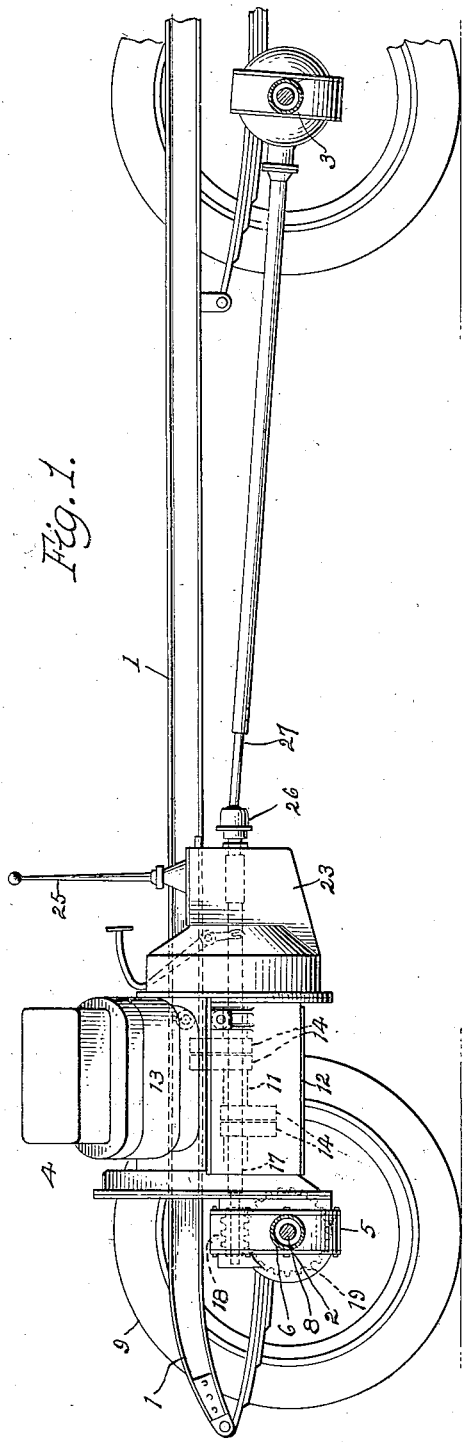
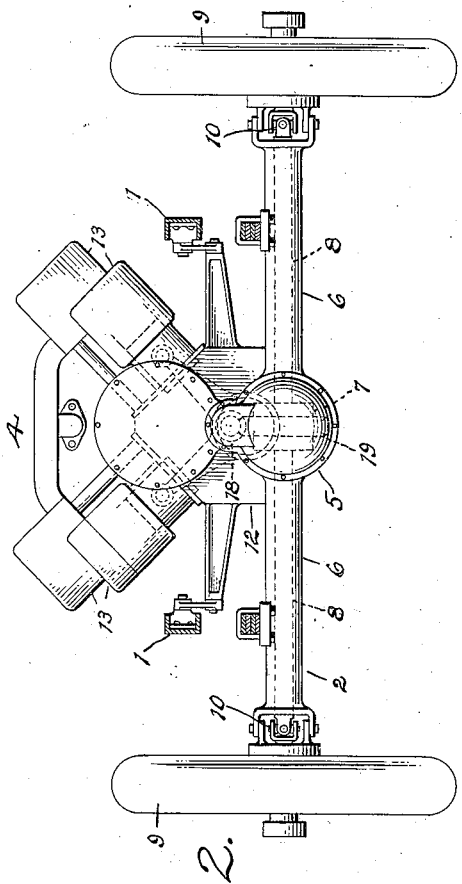
INVENTOR
John O. Heinze,
ATTORNEYS June 2, 1931.  J. O. HEINZE  1,808,109
MOTOR VEHICLE
Filed Oct. 24, 1928  2 Sheets-Sheet 2

INVENTOR
John O. Heinze,
BY
ATTORNEYS

Patented June 2, 1931

1,808,109

UNITED STATES PATENT OFFICE

JOHN O. HEINZE, OF DETROIT, MICHIGAN

MOTOR VEHICLE

Application filed October 24, 1928. Serial No. 314,561.

This invention relates to motor vehicles of the front-wheel-drive type and to a construction of motor especially adapted for use in connection with vehicles of this character.

An object of the invention is to provide a construction of internal combustion engine of the vertical or V-type whereby power may be taken off at either or both ends of the motor to facilitate the connection of the motor with the part to be driven thereby and secure compactness of arrangement and rigidity of construction. A further object is to provide a motor construction whereby the transmission of power from the motor forwardly to the front axle of a vehicle or other part to be driven, is effected in a direct, simple, compact and efficient manner with the motor and change speed mechanism arranged in the usual relative manner in the assembly. It is also an object to provide an arrangement whereby the motor is supported at its forward end directly by the front axle housing with the power shaft projecting from the front end of the motor into said housing and directly connected to differential mechanism housed within the housing, thereby providing a direct drive between the motor and axle and a very rigid and compact arrangement. Other objects are to secure the several other advantages inherent in the construction and arrangement as hereinafter described, and all as will hereinafter more fully appear.

With the above and other ends in view, the invention consists in providing an internal combustion engine with a hollow crank shaft through which a power shaft is extended, the hollow crank shaft and power shaft being operatively connected so that motion may be taken from either or both ends of the power shaft, thus making it possible, in a motor vehicle construction, to directly connect the power shaft with power transmitting means in the front axle, motion being transmitted from the engine shaft at the rear end of the engine to said power shaft, through the usual change speed gearing, and the usual relative arrangement of axle, motor and change speed gearing being thus retained.

The invention further consists in the construction of a reciprocating piston engine whereby is made possible the employment of a straight shaft to which the reciprocating motion of the pistons is applied by means of connecting rods to rotate the same, so that said shaft may be made hollow and motion may be transmitted therethrough from the rear to the front end of the engine.

The invention further consists in the matters hereinafter set forth and more particularly pointed out in the appended claims, reference being had to the accompanying drawings in which—

Figure 1 is a side elevation of a motor vehicle chassis illustrative of an application of the invention in use;

Fig. 2 is a front end elevation of Fig. 1; and

Figure 3:
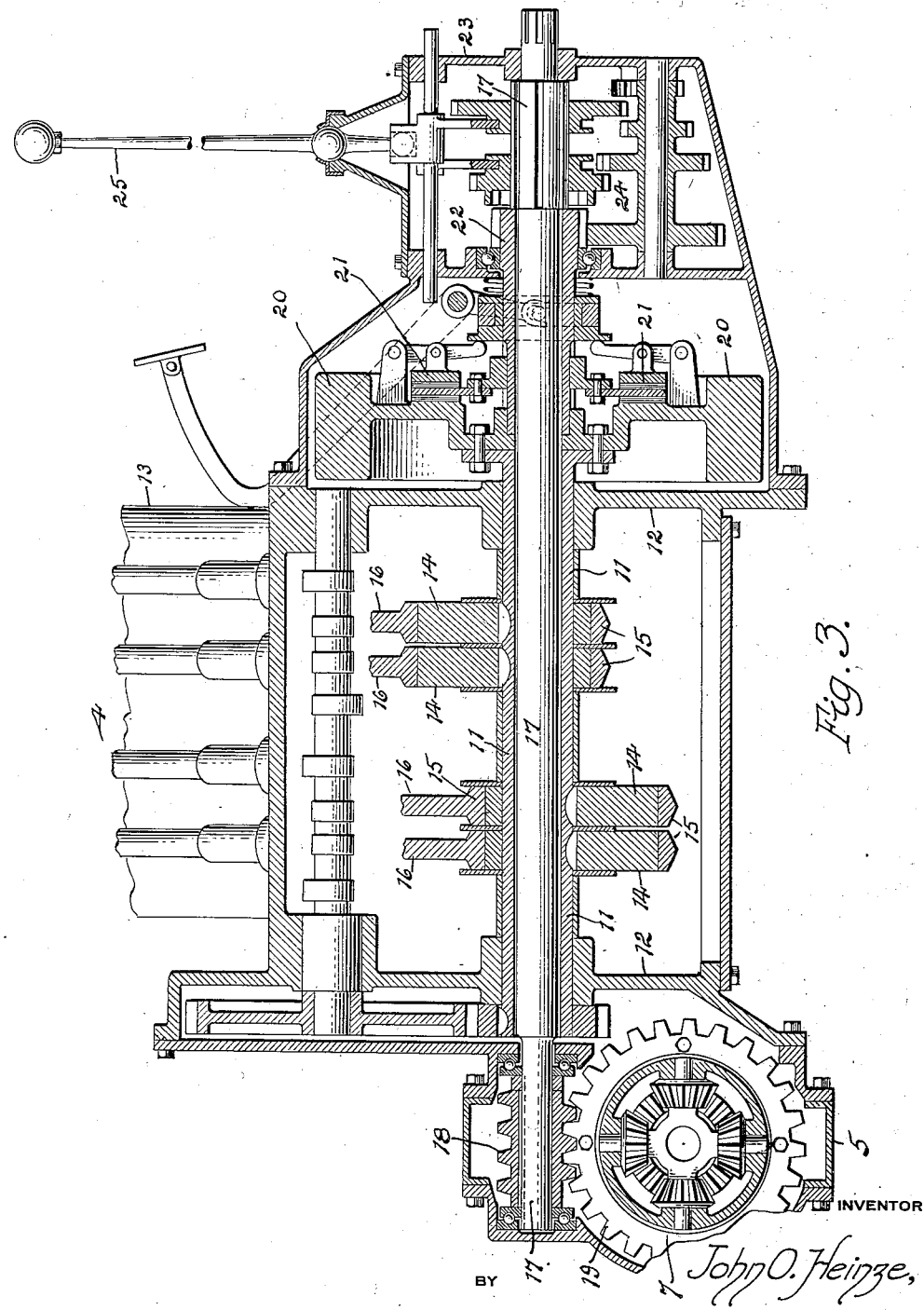
Fig. 3 is an enlarged longitudinal vertical section through an internal combustion engine embodying features of the present invention and showing the same as applied to a motor vehicle construction.

In Figs. 1 and 2 of the drawings an engine construction and arrangement embodying the present invention, is shown as embodied in a motor vehicle assembly, said motor vehicle including a chassis frame 1 which is mounted in the usual manner upon front and rear axles 2 and 3, with the engine which is indicated as a whole by the numeral 4, mounted in the usual manner upon the chassis frame 1 at its rear end and connected at its forward end to the differential housing 5 located at the center of the tubular front axle housing 6. Within the housing 5 is a common form of differential mechanism which is indicated as a whole by the numeral 7 and extending in each direction from this differential mechanism are the live axles 8 which extend to the outer ends of the axle housing and are operatively connected to the front or steering wheels 9 of the vehicle by suitable universal joints 10, the wheels being connected to the ends of the tubular axle in the usual manner for pivotal movement in directing the vehicle.

The engine 4 as illustrated in the accompanying drawings, is a V-type internal combustion engine but it will be understood that any motor of the reciprocating piston type wherein motion is transmitted from the piston or pistons to rotate a crank shaft located in the crank case of the engine, may be employed.

In motor vehicle constructions it is common practice to mount the motor with a series of upwardly extending cylinders arranged lengthwise of the vehicle chassis and just rearwardly of the front axle. It is also common practice to provide a change speed mechanism directly at the rear of the motor where it may be conveniently manipulated by the operator of the vehicle, and it is not desirable to materially change this general arrangement in order to apply power to the front or steering wheels of the vehicle in a front wheel drive. In order to retain this general arrangement and at the same time provide a simple and efficient construction, the present motor is constructed with a hollow or tubular crank shaft 11 mounted in suitable bearings and extending longitudinally of a crank case 12 of the engine directly below the several cylinders 13 in the usual manner. In the usual internal combustion engine construction, the crank shaft is a solid shaft having offset cranks to which the motion of the reciprocating pistons in the cylinders is imparted through connecting rods directly connected to the offset cranks. In the present construction, where it is desired that the crank shaft be a straight shaft, such a shaft cannot be formed with offset cranks and in the present construction, eccentrics 14 are substituted for the offset cranks, these eccentrics being rigidly secured in place upon the straight tubular shaft 11.

The reciprocating motion of the pistons in the cylinders 13 is translated into a rotary motion for rotating the shaft 11, by providing straps or bearings 15 on the lower ends of the connecting rods 16 which rods are pivotally attached in the usual manner to the pistons, and these straps or bearings 15 embrace the eccentrics 14.

With this arrangement a straight through crank shaft is provided so that this crank shaft may be made hollow to receive a power shaft 17 for transmitting motion from the rear end of the engine to its forward end where this shaft is provided with a worm gear 18 secured directly to the end of the shaft 17 in mesh with a large worm wheel 19 which forms a part of the differential mechanism 7 located within the casing 5 of the front axle. The power of the engine is therefore applied directly to the live shafts 8 of the front axle through the differential mechanism and this arrangement permits of the bolting or otherwise securing of the housing 5 directly to the forward end of the crank case of the engine. The engine is thus rigidly supported at its forward end directly by the front axle.

The usual fly wheel 20 is bolted or otherwise rigidly secured directly to the rear end of the tubular crank shaft 11 and the common form of clutch, which is indicated as a whole by the numeral 21, is provided adjacent the fly wheel for transmitting motion from the rear end of the shaft 11 to a tubular sleeve 22 mounted upon the shaft 17 and extending into the casing 23 of a change speed power transmission mechanism of an old and well-known construction which is indicated as a whole by the numeral 24. Gears forming part of this change speed mechanism are secured to the rear end of the shaft 17 and are arranged to transmit motion from the sleeve 22 to the shaft 17, with the several speeds provided by the gearing of the change speed mechanism, which gearing is shifted in the usual manner to effect changes in speed, by means of the usual hand lever 25.

The usual and common arrangement of fly wheel, clutch, and change speed mechanism located at the rear end of the engine, is thus retained, the change speed mechanism being therefore located where it may be most conveniently manipulated from within the body of the car, as is the usual practice in motor vehicle construction.

By extending the power shaft 17 forwardly through the tubular crank shaft, power is transmitted to the forward end of the engine with a direct connection to the front axle for driving the front wheels of the vehicle and if found desirable, this shaft 17 may be extended through the rear side of the transmission casing 23, and this projecting rear end may be connected by means of a universal joint 26 to a propeller shaft 27 extending to the rear axle as shown in Fig. 1. Therefore, if found desirable, all four wheels of the vehicle may be driven, power being transmitted rearwardly in the usual manner to the rear axle from the change speed mechanism, and forwardly from said mechanism by the shaft 17 to the front axle. A very compact and efficient construction is thereby secured and the usual arrangement of motor and transmission mechanism maintained, the motor extending longitudinally of the chassis and positioned at the forward end thereof.

This arrangement and direct drive of the front axle is made possible by providing a hollow crank shaft and employing eccentrics for rotating this shaft, otherwise it would be necessary to transmit motion from the change speed mechanism forwardly to the front axle through means exterior of the engine, which would give a cumbersome construction and arrangement which would be difficult to align and hold in proper position, and necessarily include universal joints to permit a relative movement between engine and axle.

A direct drive could also be secured by turning the engine end for end, connecting the rear end of the crank shaft which projects into the transmission casing, with the differential gearing of the front axle, but this would bring the transmission mechanism ahead of the engine, departing from the usual arrangement and making it unhandy and cumbersome to shift the transmission. It would also bring the engine far to the rear of the front axle and take up much valuable space within the vehicle.

Any suitable differential mechanism may, of course, be employed as well as clutch and change speed mechanisms, and other changes in the details of construction and arrangement of parts may also be made within the scope of the appended claims, without departing from the spirit of the present invention. I, therefore, do not limit myself to the particular construction or arrangement shown.

What I claim is:—

1. In a motor vehicle, the combination of a reciprocating piston engine having a tubular crank shaft provided with a crank member and a connecting member operated by piston reciprocation to rotate said shaft, a change speed power transmitting mechanism at one end of said engine, and a power-shaft extending through and projecting beyond the ends of said tubular crank shaft for transmitting motion from said change speed mechanism to the end of the engine opposite that at which said mechanism is located.

2. In a motor vehicle the combination of a vehicle having a front axle including a differential gearing, a reciprocating piston engine having a tubular crank shaft, an eccentric on said shaft, means connecting the engine piston and eccentric to directly apply the reciprocating motion of the piston to said eccentric and rotate said shaft, a power shaft extending through and projecting at its ends beyond said tubular crank shaft, said power shaft being directly connected at its forward end to said differential gearing to transmit power to said axle, and change speed gearing at the rear end of said power shaft for transmitting motion from said tubular crank shaft to said power shaft.

3. The combination with a vehicle having a tubular front axle and means within said axle for transmitting power to the front wheels of the vehicle for driving the same, of a multiple cylinder engine having pistons in said cylinders and secured at its forward end to said front axle and supported thereby, said engine having a tubular crank shaft extending in a plane at right angles to the longitudinal plane of the axle, eccentrics on said crank shaft, connecting rods connecting said eccentrics and engine pistons, a power shaft extending through said tubular crank shaft to the rear end of the engine with its forward end directly connected with the power transmitting means in the front axle, and change speed mechanism at the rear end of the engine for transmitting motion from the tubular crank shaft to said power shaft extending therethrough.

4. In a vehicle having a load carrying tubular front axle provided intermediate its ends with a differential casing and differential mechanism in said casing for transmitting power to the front wheels of the vehicle mounted on the ends of said axle for driving the same, the combination of a reciprocating piston engine supported at its forward end by said differential casing and having a tubular crank shaft provided with eccentrics connected to said pistons of said engine, a power shaft extending through said tubular crank shaft with its forward end operatively connected with said differential mechanism to transmit power thereto, and a change speed power transmitting mechanism at the rear end of said engine for transmitting motion from said tubular crank shaft to said power shaft.

5. In a motor vehicle having a tubular front axle provided with a differential housing intermediate its ends and a differential mechanism in said housing for transmitting power to the front wheels of the vehicle for driving the same, of a multiple cylinder reciprocating piston engine supported at its forward end and directly connected to said differential housing, said engine having a tubular crank shaft provided with eccentrics connected to the pistons of said engine to translate the reciprocating motion of said pistons into rotary motion for rotating said shaft, a change speed power transmitting mechanism supported at the rear end of said engine, a power shaft extending through said tubular crank shaft with its ends projecting beyond the ends of said crank shaft and with its rear end projecting through and operatively connected with said change speed mechanism and with its forward end provided with means for directly transmitting power to said differential mechanism of the front axle.

6. The combination with a vehicle having a front and rear axle provided with means for transmitting power to the ends of said axles for driving all four wheels of the vehicle, of a reciprocating piston engine having a tubular crank shaft, eccentrics on said shaft and connecting rods connecting the pistons of said engine with said eccentrics, a change-speed power transmitting mechanism for transmitting motion from said crank shaft, a power take-off shaft extending through said tubular crank shaft and through said change speed mechanism and driven thereby with its ends operatively connected to said means in said axles for driving the four wheels of the vehicle.

7. In a motor vehicle, the combination of a tubular front axle for carrying the load, ground wheels at the ends of said axle for supporting the same, said axle having a differential housing intermediate its ends, differential mechanism in said housing, shafts in said tubular axle free of the load and for transmitting motion to said ground wheels, a reciprocating piston engine directly supported at its forward end upon said tubular axle and having a tubular crank shaft, an eccentric on said crank shaft, a connecting member for transmitting the reciprocating motion of said engine piston to rotate said eccentric and tubular crank shaft, a power shaft in said tubular crank shaft and operatively connected at the forward end with said differential mechanism, and change speed mechanism at the rear end of said engine for transmitting motion from said tubular crank shaft to said power shaft.

In testimony whereof I affix my signature.

JOHN O. HEINZE.